United States Patent
Nimbalker et al.

(10) Patent No.: US 8,902,830 B2
(45) Date of Patent: Dec. 2, 2014

(54) ENERGY-SAVING BASE STATION AND METHOD

(75) Inventors: Ajit Nimbalker, Buffalo Grove, IL (US); Ravi Kuchibhotla, Gurnee, IL (US); Robert T. Love, Barrington, IL (US); Vijay Nangia, Algonquin, IL (US); Ravikiran Nory, Buffalo Grove, IL (US); Xiangyang Zhuang, Lake Zurich, IL (US)

(73) Assignee: Motorola Mobility LLC, Libertyville, IL (US)

( * ) Notice: Subject to any disclaimer, the term of this patent is extended or adjusted under 35 U.S.C. 154(b) by 489 days.

(21) Appl. No.: 12/979,846

(22) Filed: Dec. 28, 2010

(65) Prior Publication Data

US 2012/0163305 A1   Jun. 28, 2012

(51) Int. Cl.
*H04W 72/04* (2009.01)
*H04W 52/02* (2009.01)
*H04W 48/10* (2009.01)
*H04W 74/08* (2009.01)

(52) U.S. Cl.
CPC ............ *H04W 52/0206* (2013.01); *Y02B 60/50* (2013.01); *H04W 48/10* (2013.01); *H04W 74/0833* (2013.01)
USPC ........................................................ 370/329

(58) Field of Classification Search
CPC . H04W 56/00; H04W 74/0891; H04W 52/00; H04W 52/0206; H04W 52/0235; H04W 52/0277; H04W 52/143; H04W 52/146
USPC ......... 370/252, 311, 328, 318, 324, 329, 350; 455/444
See application file for complete search history.

(56) References Cited

U.S. PATENT DOCUMENTS

| | | | |
|---|---|---|---|
| 2010/0056160 A1* | 3/2010 | Kim et al. | 455/444 |
| 2011/0051640 A1* | 3/2011 | Ramesh et al. | 370/311 |
| 2011/0103243 A1* | 5/2011 | Larsson et al. | 370/252 |
| 2011/0122825 A1* | 5/2011 | Lee et al. | 370/328 |

OTHER PUBLICATIONS

Patent Cooperation Treaty, "PCT Search Report and Written Opinion of the International Searching Authority" for International Application No. PCT/US2011/066512 Apr. 2, 2012, 11 pages.
3GPP TSG RAN WG1 #59bis, R1-100275 "Opportunities for Energy Savings in LTE Networks" Huawei, Valencia, Spain, Jan. 18-22, 2010, 4 pages.
3GPP TSG RAN WG2 #69, R2-101824 updates R2-101213 "Energy saving techniques for LTE" Huawei, San Francisco, USA, Feb. 22-26, 2010, 10 pages.
3GPP TSG RAN WG1 #59, R1-095011 "Extended cell DTX for enhanced energy-efficient network operation" Ericsson, ST-Ericsson, Jeju, Korea, Nov. 9-13, 2009, 6 pages.
3GPP TSG RAN WG1 #60, R1-101132 "UE Impact of Network Energy Savings" Motorola, San Francisco, USA Feb. 22-26, 2010, 3 pages.
* cited by examiner

*Primary Examiner* — Kwang B Yao
*Assistant Examiner* — Syed M Bokhari
(74) *Attorney, Agent, or Firm* — Lerner, David, Littenberg, Krumholz & Mentlik, LLP

(57) ABSTRACT

A wireless communication user terminal obtains uplink access configuration information on a physical downlink control channel (PDCCH) addressed to a plurality of user terminals by processing the PDCCH based on a first system information received from a base station on a physical broadcast channel (PBCH) and based on synchronization information. The terminal sends a signature waveform based on the uplink access configuration information, prior to receiving system information in addition to the first system information, whereby the signature waveform enables the base station to transition from a relatively low power operating mode to a relatively high power operating mode.

15 Claims, 5 Drawing Sheets

ENERGY-SAVING BASE STATION AND METHOD

FIELD OF THE DISCLOSURE

The present disclosure relates generally to wireless communications and, more particularly, to energy-saving infrastructure entities, for example, a base station in a wireless communication network, and the control thereof by a mobile station in the network.

BACKGROUND

The Third Generation Partnership Project (3GPP) Technical Specification Group (TSG) Radio Access Network (RAN) 1 wireless communication standards development organization is discussing a proposal for wireless communication networks having base stations that save energy, otherwise known as "green" base stations. According to the proposal, if there is no active user equipment (UE) in a cell area served by an enhanced NodeB (eNB), the base station transitions to an energy saving state. In this state, the eNB transmits only a synchronization signal, a Common Reference Symbol (CRS) and a Master Information Block (MIB). In LTE Release-8, the MIB is sent on the Physical Broadcast CHannel (PBCH), the MIB comprises a system frame number (SFN), downlink system bandwidth, a number of signaled downlink transmit antennas (or the number of CRS ports), and Physical Hybrid ARQ Channel (PHICH) configuration information. Also in LTE Release-8, the synchronization signal is sent on the last 2 symbols of the first slot of subframe 0 and 5 and the PBCH is sent on subframe 0 (each subframe comprises two slots, wherein each slot corresponds to a 0.5 milli-second). Thus when configured, the eNB transmits downlink information in only subframe 0 and subframe 5 wherein nothing (i.e., blank or Do Not Transmit or Discontinous transmit (DTX)) is transmitted in the other downlink subframes. Alternatively, the other downlink subframes may be configured as MBMS Single Frequency (MBSFN) subframes with CRS transmission only near the beginning of these subframes. When there is an active user terminal in the cell, the eNB transitions from the energy saving state to a fully active state wherein the eNB starts transmitting the signals such as System Information Block (SIB) information, CRS in other subframes, etc. This proposal however does not address how an eNB or base station in the energy saving state detects when a UE is attempting to register with or connect to the eNB.

It is known generally for a 3GPP LTE Release 8 UE to send a Random Access Channel (RACH) waveform to an eNB based on information obtained in a System Information Block (SIB) sent in a Physical Downlink Shared Channel (PDSCH) to connect to the base station. In this case, the UE processes a Physical Downlink Control Channel (PDCCH) based on Physical Broadcast Channel (PBCH) information to obtain a downlink (DL) grant identifying a System Information Block (SIB) including RACH configuration information. Alternatively, the LTE Rel-8 UE obtains the RACH configuration information from a UE specific Downlink Control Information (DCI) Format 1A grant of a PDCCH order and in this case the UE is already connected to the base station and hence the eNB can transmit on a unicast PDCCH addressed the specific UE.

The various aspects, features and advantages of the invention will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

The present disclosure addresses how a base station or eNB in the energy saving state detects when a UE is attempting to register with or connect to the eNB. Among other aspects, the disclosure also describes a method for a UE to communicate with a base station that may be operating in one ore more different energy savings states.

Figure 1:
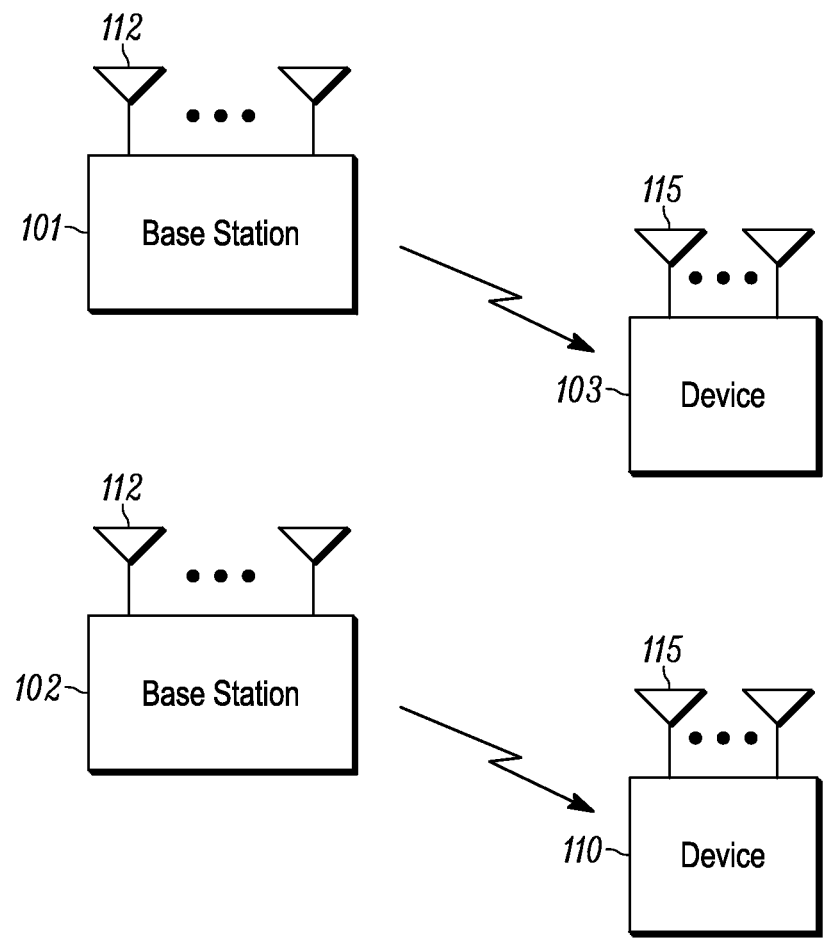
FIG. 1 illustrates a wireless communication system.

In FIG. 1, a wireless communication system 100 comprises multiple cell serving base units forming a communications network distributed over a geographical region. A base unit may also be referred to as a base station, an access point (AP), access terminal (AT), Node-B (NB), enhanced Node-B (eNB) or by other once, present or future terminology used in the art. The one or more base units 101 and 102 serve a number of remote units 103 and 110 within a serving area or cell or within a sector thereof. The remote units may also be referred to as subscriber units, mobile units, users, terminals, subscriber stations, user equipment (UE), user terminals or by other terminology used in the art. The network base units communicate with remote units to perform functions such as scheduling the transmission and receipt of information using radio resources. The wireless communication network may also comprise management functionality including information routing, admission control, billing, authentication etc., which may be controlled by other network entities. These and other aspects of wireless networks are known generally by those having ordinary skill in the art.

In FIG. 1, base units 101 and 102 transmit downlink communication signals to remote units 103 and 110 on radio resources, which may be in the time, frequency and/or code domain. The remote units communicate with the one or more base units via uplink communication signals. The one or more base units may comprise one or more transmitters and one or more receivers that serve the remote units. The number of transmitters at the base unit may be related, for example, to the number of transmit antennas 112 at the base unit. When multiple antennas are used to serve each sector to provide various advanced communication modes, for example, adaptive beam-forming, transmit diversity, transmit SDMA, and multiple stream transmission, etc., multiple base units can be deployed. These base units within a sector may be highly integrated and may share various hardware and software components. For example, a base unit may also comprise multiple co-located base units that serve a cell. The remote units may also comprise one or more transmitters and one or more receivers. The number of transmitters may be related, for example, to the number of transmit antennas 115 at the remote unit.

In one implementation, the wireless communication system is compliant with the 3GPP Universal Mobile Telecommunications System (UMTS) LTE protocol, also referred to as EUTRA wherein the base unit transmits using an orthogonal frequency division multiplexing (OFDM) modulation scheme on the downlink and the user terminals transmit on the uplink using a single carrier frequency division multiple access (SC-FDMA) or a Discrete Fourier Transform spread OFDM (DFT-SOFDM) scheme. In yet another implementation, the wireless communication system is compliant with the 3GPP Universal Mobile Telecommunications System (UMTS) LTE-Advanced protocol, also referred to as LTE-A or some later generation or release of LTE wherein the base unit transmits using an orthogonal frequency division multiplexing (OFDM) modulation scheme on a single or a plurality of downlink component carriers and the user terminals can transmit on the uplink using a single or plurality of uplink component carriers. More generally the wireless communication system may implement some other open or proprietary communication protocol, for example, WiMAX, among other existing and future protocols. The disclosure is not intended to be implemented in any particular wireless communication system architecture or protocol. The architecture may also include the use of spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading. The architecture in which the features of the instant disclosure are implemented may also be based on simpler time and/or frequency division multiplexing/multiple access techniques, or a combination of these various techniques. In alternative embodiments, the wireless communication system may utilize other communication system protocols including, but not limited to, TDMA or direct sequence CDMA. The communication system may be a TDD (Time Division Duplex) or FDD (Frequency Division Duplex) system.

According to one aspect of the disclosure, one or more base stations operate in either a first mode or in a second mode. In one embodiment, the first mode of operation is a relatively low power consumption mode and the second mode of operation is a relatively high power consumption mode.

Generally, base stations transmit synchronization information on a synchronization channel and system information on a broadcast channel. The synchronization channel may include, for instance, physical cell identifier (PCID), frame timing information, etc. depending on the wireless protocol being implemented. The synchronization signals are typically processed in the UE as part of a cell search procedure to detect and acquire signals from an LTE base station (i.e., an eNB that is transmitting signals conformant to LTE specification). In 3GPP LTE systems, the synchronization channel enables the UE to acquire the PCID, timing synchronization, frequency synchronization, Radio Frame timing (10 ms), subframe timing (1 ms), cyclic prefix (CP) format and the duplex format (whether the cell is using FDD or TDD). The Synchronization channel comprises the Primary Synchronization Signal (PSS) and Secondary Synchronization Signal (SSS) that together are utilized by the UE. The PSS includes a sequence selected from Zadoff-Chu sequences, which are also known as Generalized Chirp-Like (GCL). The SSS includes sequences that are based on maximum length sequences or M-sequences. The synchronization signals are transmitted on the inner six PRBs or inner 72 subcarriers (i.e., 1.25 MHz). The exact location of the PSS/SSS depends upon the duplex type, Cyclic Prefix length, etc. In 3GPP LTE systems, the first system information is typically transmitted on a Primary Broadcast Channel (PBCH). For instance the first system information may be a Master Information Block (MIB) comprising system frame number (SFN), downlink system bandwidth, number of signaled downlink transmit antennas (or the number of CRS ports), and Physical Hybrid ARQ Channel (PHICH) configuration information. In other words, a UE is able to acquire the SFN, etc by processing the PBCH. In other cases (e.g., when the UE is handed over from a source cell to a target cell), some of the target cell system information may be included in the HandOver (HO) message transmitted from the source cell to the UE. The base station also transmits uplink access configuration information. In 3GPP LTE systems, the uplink access configuration information is transmitted on a physical downlink control channel (PDCCH) addressed to a plurality of user terminals. The uplink access configuration information may be obtained by processing the PDCCH using the first system information and the synchronization information. The PDCCH is transmitted in the control region that is temporally located at the beginning of a downlink subframe. However, in other scenarios, the PDCCH may also be located in certain fixed or variable time/frequency/spatial resources, i.e., spanning one or more subcarriers in one or more subframes and/or one or more spatial layers.

The base station includes a wireless signal transmitter suitable for transmitting these and other signals to UEs within the coverage area of the base station. The base station transmitter is typically part of a transceiver that is controlled by a digital processor, hardware equivalent circuitry, or by a combination thereof. This and other functionality of the base station may be controlled by a digital processor implementing instructions stored in a memory device of the base station, by hardware equivalent circuitry or by a combination thereof as described herein.

In one embodiment, the base station operates in a relatively low power consumption mode when the base station does not serve any user terminals. Base stations have a variety of electronics, including Radio Frequency (RF), baseband, and antenna systems, including components such as power amplifiers, baseband controllers and processors, software modules, heat dissipation systems, etc. Typically, the designers of a base station may also incorporate energy savings mechanisms such as shutting off, when possible, components that may otherwise consume energy. For instance, when possible, a base station may put one or more components controllers in sleep mode (i.e., idle or minimized utilization mode) and rely on a smaller number of controllers to provide the necessary functionality. This allows the base station operation while save power. Such optimization of software/hardware component utilization is typically a proprietary affair and is implementation-specific and possibly vendor specific (i.e., up to the base station designer). However, there are other potential energy savings when considering the LTE operation from a physical layer perspective. For instance, an LTE base station is typically expected to transmit signals (such as CRS, Synchronization signals, System information, etc.) regularly with a certain periodicity or duty cycle. This information allows a UE to detect, connect and communicate with the base station. However, when there is a low load (i.e., no or few UEs are connected to the base station), then the base station can modify the transmission of signals without affecting the service provided to the UEs. Thus, in a low power mode, the base station typically transmits a smaller number of signals relative to a high power mode wherein the base station transmits a larger number of signals. More specifically, in the low power mode, the base station may transmit (e.g., broadcasting) a first amount of system information, and in a second high power mode the base station may transmits a second amount of system information. Typically, the second amount of system information is greater than the first amount of system information. In the LTE example, the first amount of system information may be the MIB and/or SIB1. The second amount of system information may comprise of MIB, SIB1, and other SIBs such as SIB2, SIB3, etc. In either mode, the base station may transmit the CRS, Synchronization Signals, and/or other signals necessary to keep the appearance of an LTE cell. The operation of the base station in the relatively high or low power consumption modes based on the various criteria described herein is also controlled by a digital processor implementing stored instructions, by hardware equivalent circuitry or by a combination thereof.

In one embodiment, described further herein, the base station transmits an uplink access configuration information that is used by a UE to transmit a waveform that enables the UE to request the base station to transition from low power mode to high power mode where the base station transmits a second amount of system information. In one example, the first amount of system information may comprise of a system information message (e.g., SIB1) containing schedule of other system information and the second system information includes the other system information (SIB2, SIB3 . . . ). The low power mode or high power mode is distinct from the mode in which the Base Station power is completely turned off and the base station is not transmitting any LTE signals.

Generally, a base station does not serve any user equipment when the base station does not detect any user equipment in an active mode such that the base station does not schedule data packets or the transmission of user equipment specific control signals or messages. In one proposed 3GPP LTE implementation, a base station does not serve any user terminals when the base station has not assigned a cell-radio network temporary identifier (C-RNTI) or Temporary C-RNTI to any user equipment. In other words, the base station may not be serving any UEs in the Radio Resource Connection (RRC) connected mode. In wireless communication protocols, other conditions or criteria may be used as a basis for determining whether or when the base station is serving user terminals. Also, any one of these conditions or other criteria for determining whether the base station is serving user equipment may be conditioned on the passage of a specified time interval during which the condition or criteria must persist before a determination may be made as to whether the base station is serving any user equipment. Thus the base station will transition from operating in a high power mode to a power savings mode when the base station does no longer serves any user terminals as described above.

Figure 2:
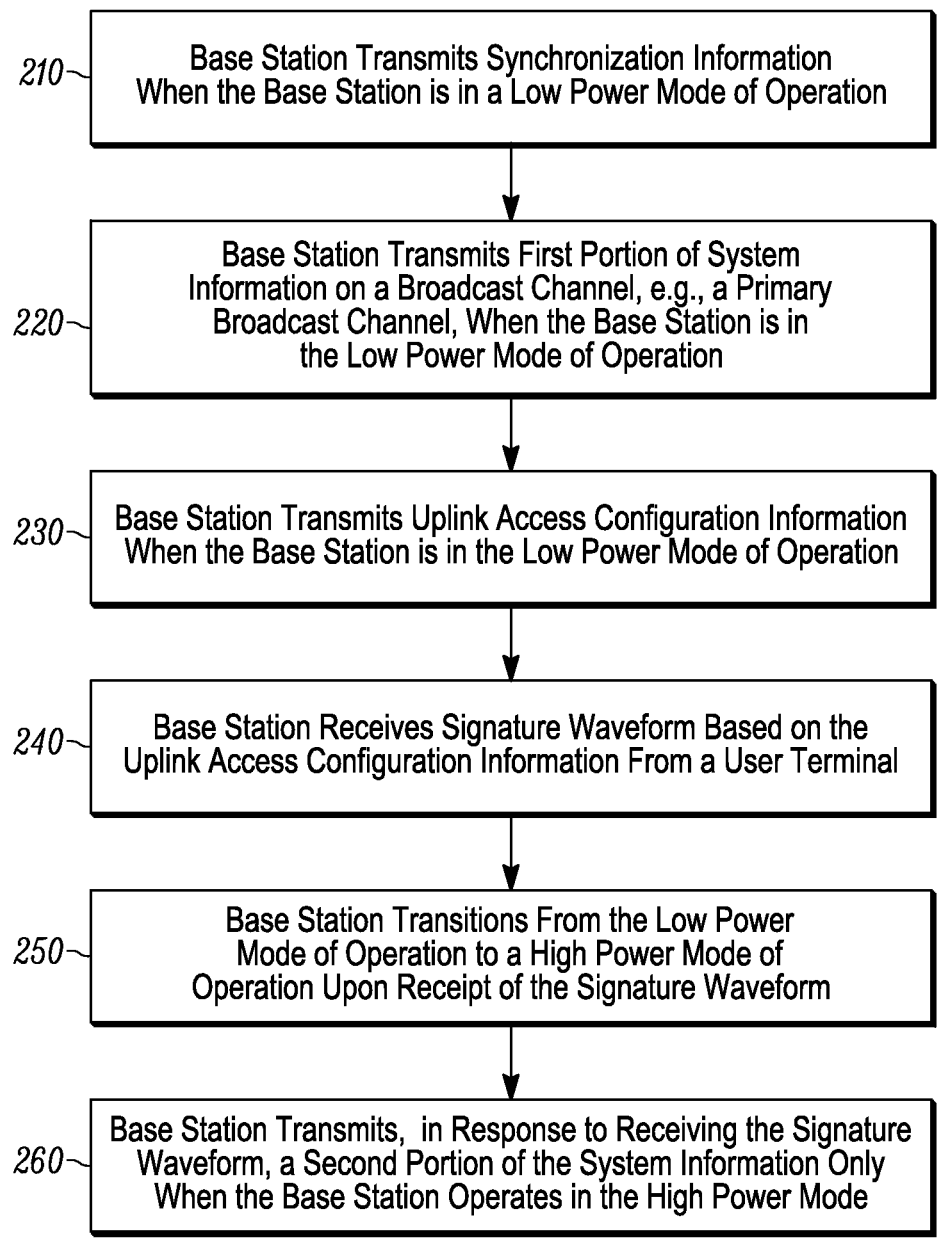
FIG. 2 illustrates a process implemented in a wireless communication base station.
Figure 3:
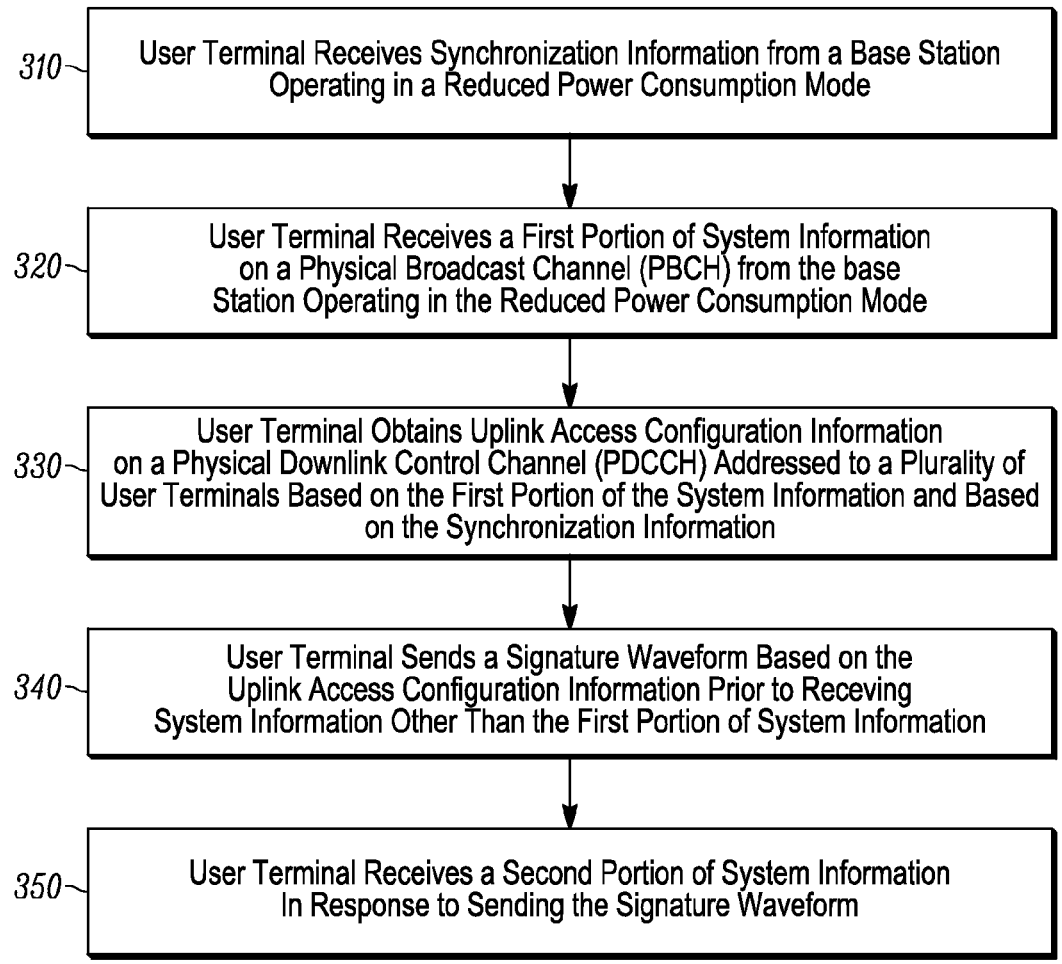
FIG. 3 illustrates a process implemented in a wireless communication user terminal.

According to one aspect of the disclosure, when the base station operates in the relatively low power mode, the base station transmits only synchronization information, a portion of the system information, and uplink access configuration information. The base station transmits at least a second portion of system information when it receives or detects an uplink waveform that is transmitted from one or more UEs based on the uplink access configuration information. In one implementation, the base station does not transmit all the system information in the subframes when operating in the low power mode. In FIG. 2, at 210, the base station transmits synchronization information when the base station is in a first mode of operation, also referred to as the low power consumption or a reduced power mode of operation. In FIG. 3, at 310, as user terminal receives synchronization information from a base station operating in the reduced power mode.

In FIG. 2, at 220, the base station transmits a first portion of system information on a broadcast channel when the base station is in the reduced power mode. Here, the modifier "first" is used to differentiate among other portions of the system information. In one 3GPP LTE implementation, the base station, or eNB, transmits a first portion of system information in the subframe 0 and subframe 5 when operating in the low power mode. More specifically, the base station may be transmitting MIB on subframe 0 and SIB1 in subframe 5 on even radio frames. In some cases, the MIB and SIB1 may together be considered as being transmitted on PBCH and in other cases the MIB only may be considered as being transmitted on PBCH. The base station may occasionally be transmitting an uplink access configuration on a PDCCH addressed to a plurality of user terminals. In the 3GPP LTE implementation, the first portion of the system information is transmitted on a Primary Broadcast Channel (PBCH). In one embodiment, which may be implemented in a 3GPP LTE system or some other wireless communication protocol system, the first portion of the system information indicates at least one of the following elements of information: whether the base station is transmitting uplink access configuration information on a Physical Downlink Control Channel (PDCCH); or whether the base station is transmitting system information blocks; or whether the base station is operating in the first mode or the second mode. In alternative embodiments, the first portion of the system information is indicative of a combination of these information elements.

In FIG. 3, at 320, a user terminal receives, at a wireless signal receiver of the user terminal, a first portion of system information on a Physical Broadcast Channel (PBCH) from the base station operating in the reduced power consumption mode. In one embodiment, the user terminal processes a physical downlink control channel (PDCCH) addressed to a plurality of user terminals based on the physical broadcast channel (PBCH) information and based on the synchronization information to obtain uplink access configuration information on the PDCCH as described more fully below. The receiver of the user terminal is typically part of a wireless signal transceiver that may be controller by a digital processor implementing stored instructions, by hardware equivalent circuitry or by a combination thereof. The processing of the received signals may be implemented by a digital processor implementing stored instructions, by hardware equivalent circuitry, or by a combination thereof. These and other functional aspects of the user terminal are described further herein.

In FIG. 2, at 230, the base station also transmits a message having uplink access configuration information when the base station is in a first mode of operation. The uplink access configuration information is generally transmitted to a plurality of user terminals. In one 3GPP LTE implementation, the uplink access configuration information is contained in the PDCCH message that does not allocate any resources on a physical downlink shared channel (PDSCH). In another embodiment, the base station transmits more that one PDCCH with each PDCCH having uplink access configuration information addressed to a plurality of user terminals. In FIG. 3, at 330, the user terminal obtains uplink access configuration information on a PDCCH addressed to a plurality of user terminals based on the first portion of the system information and based on the synchronization information. In one embodiment, the user terminal receives the PDCCH at a beginning portion of a subframe, wherein the subframe comprises a control region at the beginning portion of the subframe. The PDCCH is transmitted in the control region that is temporally located at the beginning of a downlink subframe as it allows the UE to detect the control channel quickly (within the first few OFDM symbols of the subframe) and then turn off its receiver circuitry for the remainder of the subframe to save power (i.e., exploit "micro-sleep"). However, in other scenarios, the PDCCH may also be located in certain fixed or variable time/frequency/spatial resources i.e., spanning one or more subcarriers in one or more subframes and/or one or more spatial layers. For instance, the uplink access configuration information may be placed in a logically defined search space that is UE-specific or cell-specific and the search space candidates gets mapped to (time/frequency/spatial) resources either in the typical Rel-8 PDSCH region (e.g., the rest of the subframe excluding the PDCCH) or to a set of PRBs that is configured for transmission of enhanced or augmented PDCCH. In any case, the UE determines the resources for decoding the access information based on the synchronization signals, the first portion of the system information. Alternatively, the UE may be signaled to detect the uplink access information based on signaling from another base station.

The uplink access configuration information obtained by the user terminal includes at least one of the following: uplink system bandwidth information; or uplink resource block assignment information; or uplink frequency assignment information; or a preamble index; or a physical random access channel (PRACH) mask index. In one embodiment the uplink access configuration information includes signature waveform characteristic information. In other embodiments, however, the signature waveform may have been previously stored on the user terminal. The PDCCH is generally sent by the base station in a downlink subframe wherein the signature waveform is sent by the user terminal after a delay relative to receipt of the PDCCH downlink subframe. The delay may be signaled as a part of the uplink access configuration information or it may have been stored locally on the user terminal as some prior time.

In some embodiments, the uplink access configuration information also includes an uplink access waveform trigger that is indicative of a waveform characteristic. For instance, the waveform trigger may comprise a field with one or more bits indicating one of the following states: "0"—indicating Send Uplink Access Waveform; or "1"—indicating Do Not Send Uplink Access Waveform. In other examples, the uplink waveform trigger may also contain a channel quality measurement threshold (e.g., a Channel Quality Indicator (CQI) threshold, or a Reference Signal Receive Power (RSRP) threshold, or a Reference Signal Received Quality (RSRS) threshold that the UE may utilize to determine whether it should transmit the uplink access configuration waveform. Additionally, the trigger might also include a counter threshold, wherein the UE is allowed to transmit the uplink access waveform only if it detects the message a predetermined number of times within a predetermined time duration as indicated by the threshold. These methods allow an eNB to reduce false signaling (unnecessarily waking up because of misdetection) while maintaining the service to legitimate UEs. The message may be encoded with error detection coding (e.g., an 8, 16 or 24-bit Cyclic Redundancy Check Code) and/or error correcting code (e.g., convolutional code (tail or tail-biting), turbo code, Low-density parity check code, Reed Solomon Code, etc.) and/or cell-specific or UE-specific scrambling codes prior to modulation and transmission over the channel.

For Home Base Stations, additional triggering may be provided wherein only legitimate users (e.g., a subscriber that owns the Home Base Station and/or users that are allowed to modify the power savings state of the Home Base station) can receive the uplink access configuration information or only legitimate users can transmit the uplink access configuration information. This may be done by setting up the permissions appropriately when the HeNB is configured e.g., during the initial set-up phase or using an application on the mobile device of the user. Thus, during the set-up the HeNB and the device may, based on a handshake, agree on at least a first part of predefined characteristics of the uplink access waveform. Then, like the typical base station, the second part of the uplink access waveform may be transmitted as described in the previous paragraph. Since, any malicious or illegitimate user equipment is not privy to the first part of predefined characteristics of the uplink access waveform, the user may not be able to transmit the uplink access waveform to modify the HeNB's operation.

In FIG. 3, at 340, the user terminal sends a signature waveform based on the uplink access configuration information prior to receiving system information other than the first portion of the system information. In one embodiment, the user terminal sends a waveform having a predetermined characteristic that is based on the uplink access waveform trigger as described further below. As described previously, the waveform characteristic may also be based on the synchronization information and/or the first portion of system information. For example, the first portion of the system information may contain the frequency location of the uplink waveform and/or the uplink RACH preamble. The trigger then simply indicates whether the UE sends the uplink waveform or not.

In one embodiment the base station transmits and the user terminal receives an indication of whether the base station is operating in the high power mode or the low power mode. In certain cases, the detection of the uplink access configuration information at the UE may be an implicit indication of the mode of the base station. Alternatively, the base station transmits an indication of whether the base station is transmitting System Information or not transmitting System Information. This information may be transmitted when the base station is in the high power mode or in the low power mode. This indication may be transmitted on a Physical Broadcast Channel (PBCH) and/or on a Physical Downlink Control Channel (PDCCH) for receipt by the user terminal. In embodiments where the base station transmits a low power mode indicator, the user terminal monitors a PDCCH DCI format after receiving a relatively low-power mode indicator from the base station, wherein the DCI Format conveys the uplink access configuration information.

In FIG. 2, at 240, the base station receives the signature waveform based on the uplink access configuration information from a user terminal. At 250, the base station transitions from the low power mode of the operation to a relatively high power consumption mode of operation in response to in response to receiving the signature waveform. In the low power mode, the base station typically transmits a smaller number of signals relative to a high power mode wherein the base station may be transmitting a greater number of signals. More specifically, in the low power mode, the base station may be transmitting (e.g., broadcasting) a first amount of system information, and in a second high power mode the base station may be transmitting a second amount of system information. Typically, the second amount of system information is greater than the first amount of system information. In the LTE example, the first amount of system information may be the MIB and/or SIB1. The second amount of system information may comprise of MIB, SIB1, and other SIBs such as SIB2, SIB3, etc. In either mode, the base station may be transmitting the CRS, synchronization signals, and/or other signals necessary to keep the appearance of an LTE cell. Thus, in the low power mode, the base station is not transmitting all SIBs necessary for a UE to acquire full service from the base station. In the high power mode, the base station transmits all the necessary SIBs that a UE requires to acquire full service from the base station. As discussed herein, the base station may transmit the uplink access configuration information in the low power mode. The UEs, after detecting the configuration information, may send a conformant uplink waveform to request the base station to transition operating modes.

In some embodiments, the base station sends mode transition information to one or more network infrastructure entities, e.g., to neighboring base stations, core network elements, energy management stations, etc., mode transition information indicative of transitioning from operating in the low power mode to the high power mode. Such information may be useful for cooperation with the neighboring cells (or Base stations) e.g., with respect load balancing, handover optimization, etc.

In FIG. 2, at 250, the base station transitions from the low power mode of operation to a high power mode of operation in response to receiving the signature waveform. In some embodiments, the base station transmits mode transition information to one or more other network infrastructure entities. The other network entities include other base stations or access points, relays, and network controllers, among other network infrastructure entities. The mode transition information indicates that the base station has transitioned from the power savings mode to the high power consumption mode.

In FIG. 2, at 260, the base station transmits a second portion of the system information, different than the first portion thereof, in response to receiving the signature waveform. In one embodiment, the second portion of the system information is transmitted only after the base station transitions to operate in the relatively high power consumption mode. In FIG. 3, at 350, the user terminal receives the second portion of system information in response to sending the signature waveform. In one embodiment, the second portion of the system information comprises a system information block (SIB) including scheduling information for additional system information blocks (SIBs).

The SIB1 typically includes cell access related information such as Public Land Mobile Network (PLMN) identity, tracking area code, frequency band indicator, etc. The SIB1 may also include cell selection information such as receive signal levels. The SIB1 also includes the scheduling information for other system information blocks such as the number of other SIBs, the sequence of transmission, the transmission window size, the periodicity, etc.

The other SIBs include SIB2, SIB3, etc. These SIBs include additional system information that is required to get full service from the base station. For example, the additional system information can comprise uplink system bandwidth, radio resource configuration information common to the cell, the MBSFN and/or other subframe configurations, mobility related parameters, cell selection parameters, neighbor cell information, intra/inter-frequency cell re-selection parameters, inter Radio-Access Technology (inter-RAT) reselection parameters, etc.

Apart from the System information, the base station may be transmitting the paging messages via the Paging Channel (PCH) which is transmitted on the DL-SCH and scheduled via the PDCCH.

In an E-UTRA system, an uplink data channel may be a physical uplink shared channel (PUSCH), an uplink control channel may be a physical uplink control channel (PUCCH). Within a PUCCH Resource Block, an eNB may assign multiple UEs (i.e., via code division multiplexing) to transmit control information using different cyclic shifts or different PUCCH resources. The uplink control information may be communicated over the PUCCH and/or multiplexed along with uplink data and transmitted over the PUSCH. The UE may further transmit uplink sounding reference signals to assist the eNB on scheduling uplink (for frequency division duplex (FDD)) and for one or both uplink and downlink for time-division duplex (TDD). In the Rel-8 LTE and beyond LTE systems such as Rel-10 (also known as LTE-Advanced), the UEs transmit on the uplink using a single carrier frequency division multiple access (SC-FDMA) scheme and/or Discrete Fourier Transform Spread OFDM (DFT-SOFDM). On the UL, the UE may transmit using contiguous or non-contiguous resource allocations and the UE may also transmit data and control on the uplink simultaneously using the so-called simultaneous PUCCH and PUSCH transmission scheme. In TDD systems, the uplink signals may also be transmitted in the UpPTS portion of the special subframe.

In another embodiment, the user terminal transmits a signal to a first serving base station wherein the signal triggers the first base station to signal a second base station to transition from a power savings mode to a relatively high power consumption mode. In response, the user terminal receives synchronization information from the second base station that transitioned from the low power mode to the high power in response to the signaling from the first base station. According to this alternative embodiment, the user terminal receives from the first base station a handoff request message along with handoff information including uplink access configuration information for handing off to the second base station. The user terminal transmits on the second base station PRACH, a signature waveform based on the uplink access configuration information received form the first base station. The signature waveform may be a RACH preamble, Uplink DFT-SOFDM waveform with a pre-determined payload and demodulation reference signal cyclic shift value, or a PUCCH resource for one of scheduling request, a CQI, or an ACK/NACK. Since the UE may be in an uplink non-synchronized state, the UE may transmit the uplink signal assuming a reference timing advance value that may be signaled in the downlink grant, or is pre-determined or fixed to 0. The timing reference may be based on the downlink timing at the UE reception. Thereafter, the user terminal receives and processes a physical downlink control channel (PDCCH) addressed to the user terminal from the second base station. In one embodiment, the user terminal receives the handoff request and the uplink access information from the first base station without first reporting measurements taken from the second base station to the first base station.

In another embodiment, the user terminal transmits a signal to a first serving base station. In one embodiment, the signal transmitted by the user terminal includes at least location coordinates of the user terminal. The signal transmitted by the user terminal triggers the first base station to signal the second base station to transition from a power savings mode to a relatively high power consumption mode. In response, the user terminal receives synchronization information from the second base station that transitioned from the low power mode to the high power in response to the signaling from the first base station. According to this alternative embodiment, the user terminal receives from the first base station a handoff request message along with handoff information including uplink access configuration information for handing off to the second base station. The user terminal transmits, on the second base station PRACH, a signature waveform based on the uplink access configuration information received form the first base station. Thereafter, the user terminal receives and processes a physical downlink control channel (PDCCH) addressed to the user terminal from the second base station. In one embodiment, the user terminal receives the handoff request and the uplink access information from the first base station without first reporting measurements taken from the second base station to the first base station.

In another embodiment, signaling between a user and a first base station may be used to transition a second base station from a low power mode to a high power mode. In this embodiment, the user terminal transmits a signal to a first serving base station. In one embodiment, the signal transmitted by the user terminal includes at least location coordinates of the user terminal. In this embodiment, the signal transmitted by the user terminal triggers the first base station to request a UE to send a RACH signal that may be detected by the second base station. The user terminal receives a message including uplink access configuration information (e.g., RACH signal characteristics) from the first base station. The user terminal transmits a signature waveform, or the RACH signal, to a second base station operating in a low power consumption mode, wherein the signature waveform is based on the uplink access configuration information. In response, the second base station transitions from the low power mode to a high power mode upon receiving the signature waveform. After transitioning to the high power mode, the second base station transmits and the user terminal receives synchronization information. In one implementation, the synchronization information transmitted by the second base station includes a primary synchronization signal, a secondary synchronization signal and/or at least one pilot signal.

Figure 4:
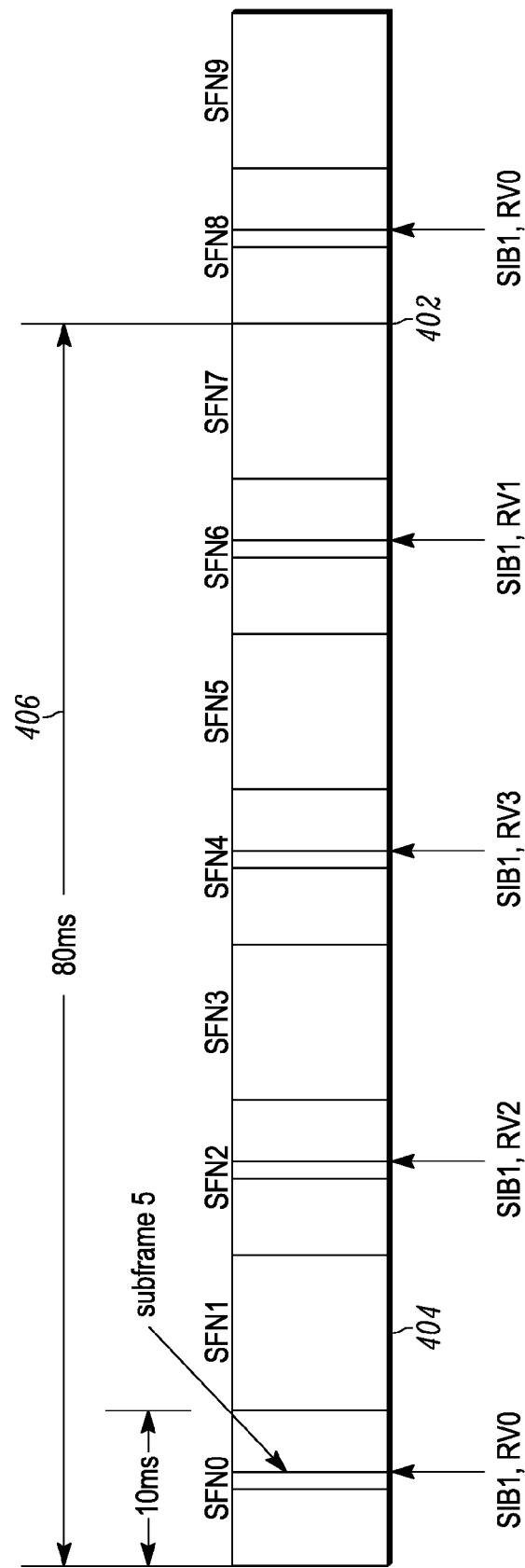
FIG. 4 illustrates a typical frame structure in a Long Term Evolution (LTE) system with SIB1 transmissions.

FIG. 4 illustrates the transmission of the SIB1 message within an SI transmission window 406. The UE may accumulate (or combine) multiple transmissions of an SI message within a transmission window for improved SI reception due to HARQ combining. The DL transmission from a base station comprises a transmission of a sequence of Radio Frames 402 that are sequentially labeled according to the system frame number (or SFN), which repeats or wraps around after 1024 Radio Frames. Each radio frame 408 comprises of ten 1 ms duration subframes. In FDD, each Radio Frame contains ten DL subframes, where in TDD mode, the radio frame comprises of DL subframes, UL subframes and/or additional subframe types such as Special subframe that includes Downlink Pilot time slot (DwPTS), a Guard Period (GP) to enable switching between DL reception and UL transmission at the UE, and an Uplink Pilot time slot (UpPTS) (and also between DL transmission and UL reception at the base station). Each subframe in a radio frame has a 1 ms duration (two 0.5 ms duration slots) comprising of a number of OFDM symbols, depending on the cyclic prefix length value. The SIB1 schedule is fixed and it is transmitted on subframe 5 in even radio frames. The SIB1 is sent via the PDSCH, and the control information required to decode SIB1 is transmitted via the PDCCH on the corresponding sub frames. It is also possible to send the PDCCH on a subframe that is relatively offset (e.g., n subframes earlier) compared to the corresponding SIB1 PDSCH transmission. Some additional parameters required to decode the PDSCH for instance, the Redundancy Version (RV) may be explicitly signaled in the DL grant and/or implicitly coded or implicitly determined based on a pre-determined set of parameters such as one of a reference system frame number, reference subframe number within a SI transmission window and/or the cell identifier, etc.

Figure 5A:
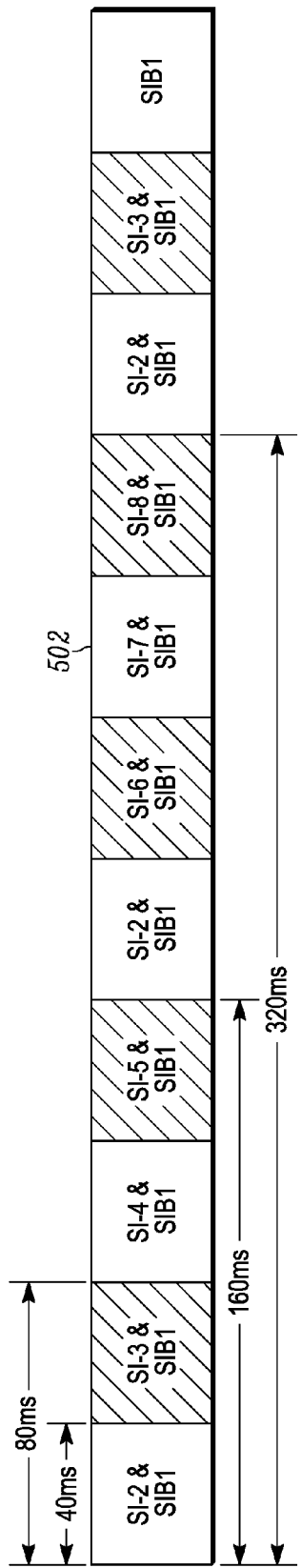
FIG. 5A illustrates an SI transmission window.
Figure 5B:
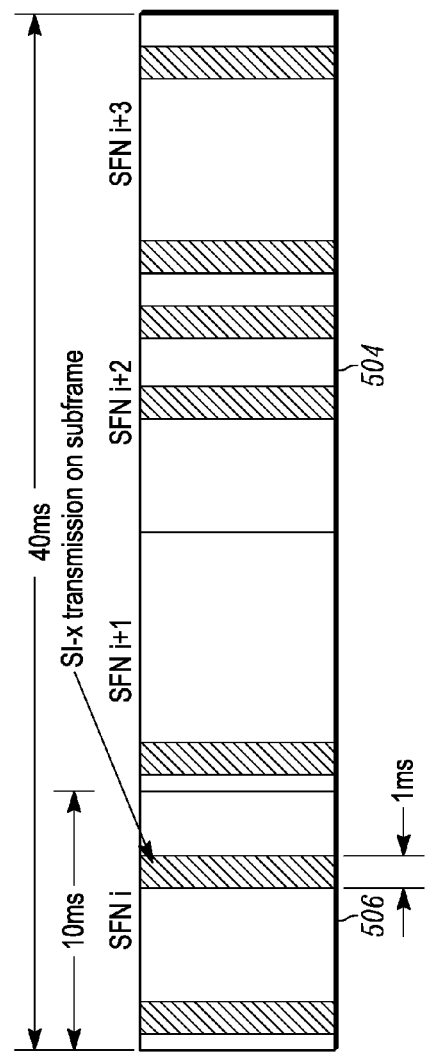
FIG. 5B illustrates transmission on a 1 ms subframe within an SI-x transmission window.

FIG. 5A shows an illustration of the SI transmission window 502 for the transmission of SIBs, including SIB1, SIB2 among other SIBs. As described above, each SIBx x=1, 2 . . . is encoded and transmitted multiple times within a SI transmission window. Thus, as shown in the FIG. 5A, SI-2 (or SIB2) is transmitted within the first 40 ms window along with the SIB1. For instance, the SI-x or SIx (x=2) transmission on a 1 ms subframe 506 within the SI-x transmission window is shown in FIG. 5B. In the 40 ms window, the SIB1 is transmitted on subframe 5 of even radio frames, whereas SIB2 is potentially transmitted on the remaining DL subframes of the 40 ms SIB2 transmission window 504. Since SIBx is scheduled via the PDCCH, the presence of a DL DCI Format with the cyclic redundancy check (CRC) scrambled by SI-RNTI is an indicator of whether the subframe contains the SIBx transmission or not. Thus, the SIB1 and SIB2 transmissions are time-multiplexed at the subframe level. After the SIB2 transmission, the SIB3 transmission window occurs, wherein SIB3 is transmitted. The number of transmissions for each SIBx (x=2, 3, . . . ) is left up to eNB or base station implementation and the operator may determine the suitable parameters based upon the cell design, coverage, and other aspects. The 3GPP specification provides sufficient signaling flexibility in the transmission window sizes for SIBx (x=2, 3 . . . ). Thus, SIB2, SIB3, and other SIBs transmission windows are concatenated to form the SI transmission window comprising of 320 ms. At the beginning of the next SI transmission, the eNB restarts the SI transmission windows as signaled in SIB1. If the SIBx transmission windows are changed, that generally implies a change in the SIB1 contents, which implies the eNB has to page the UEs in the cell to wake up and reacquire the SI. The above mechanism works well for FDD. For TDD systems the same concept of transmission windows, wherein typically, only the DL subframes within the transmission windows are considered to be valid for SI-x transmissions (x=1, 2 . . . ). Thus the uplink subframes are excluded when considering the transmission of SI-x from the base station. However, it may be possible for an eNB to dynamically reassign a subframe configured as an uplink subframe to be used for SI-x transmission on the DL. This requires the eNB to include signaling that informs the UE to look for additional DL resources schedulable in the UL subframes. This may be done by requiring the UE to blindly decode an UL subframe, and if a valid PDCCH region is detected, then the UE may assume that the UL subframe has been re-configured and used by the eNB to schedule a valid DL resources.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a base station that operates in a first mode and in a second mode, the method comprising: transmitting, from the base station, synchronization information when the base station operates in the first mode, the first mode being a power saving mode; transmitting, from the base station, Primary Broadcast Channel (PBCH) information, the PBCH information including a first portion of broadcast system information when the base station operates in the first mode; transmitting, from the base station, uplink access configuration information, including signature waveform characteristic information, when the base station operates in the first mode; receiving, at the base station, a signature waveform from a user terminal, the signature waveform having a characteristic based on the uplink access configuration information; and transmitting, from the base station, in response to receiving the signature waveform, a second portion of the system information different than the first portion of the system information, the second portion of the system information being transmitted on a broadcast channel only when the base station operates in the second mode.

2. The method of claim 1 further comprising transitioning the base station from the first mode of operation to the second mode of operation in response to receipt of the signature waveform.

3. The method of claim 1 further comprising transitioning the base station from operating in the second mode to operating in the first mode when the base station does not serve any user terminals.

4. The method of claim 1, wherein the first portion of the system information indicates at least one of the following:
   whether the base station is transmitting uplink access configuration information on a physical downlink control channel (PDCCH);
   whether the base station is transmitting system information blocks; or
   whether the base station is operating in the first mode or the second mode.

5. The method of claim 1 further comprising sending, from the base station, mode transition information to one or more network infrastructure entities, the mode transition information indicative of the transition from the first mode to the second mode.

6. The method of claim 1, wherein the second portion of the system information comprises a system information block that includes scheduling information for additional system information blocks.

7. The method of claim 1, wherein the first mode of operation is a relatively low power consumption mode and the second mode of operation is a relatively high power consumption mode, the base station transmits only the synchronization information, the first portion of system information, and the uplink access configuration information in the relatively low power consumption mode.

8. The method of claim 1, wherein the uplink access configuration information includes at least one of the following:
   uplink system bandwidth information;
   uplink frequency assignment information;
   a preamble index; and;
   a physical random access channel (PRACH) mask index.

9. A method for a wireless communication user terminal to enable a base station to transition from a relatively low power operating mode to a relatively high power operating mode, the method comprising: receiving, at the user terminal, synchronization information from the base station operating in the relatively low power operation mode; receiving, at the user terminal, first broadcast system information, on a physical broadcast channel (PBCH); obtaining uplink access configuration information, including signature waveform characteristic information, in a downlink control information format on a physical downlink control channel (PDCCH) addressed to a plurality of user terminals by processing the PDCCH on a cell-specific search space based on the first broadcast system information and based on the synchronization information; sending, from the user terminal, a signature waveform having a characteristic based on the uplink access configuration information, prior to receiving second broadcast system information in addition to the first broadcast system information; and receiving, at the user terminal, the second broadcast system information, the second broadcast system information being received on a broadcast channel only when the base station operates in the relatively high power operating mode.

10. The method of claim 9,
   wherein the synchronization information, the PBCH, and the PDCCH are received from a base station operating in the relatively low power operating mode,
   receiving system information, at the user terminal, in response to sending the signature waveform.

11. The method of claim 9, wherein obtaining the uplink access configuration information includes obtaining at least one of the following:
   uplink system bandwidth information;
   uplink frequency assignment information;
   a preamble index; and
   a physical random access channel (PRACH) mask index.

12. The method of claim 9, wherein obtaining the uplink access configuration information includes obtaining signature waveform characteristic information.

13. The method of claim 9 further comprising receiving the PDCCH in a downlink subframe, wherein the signature waveform is sent after a delay relative to receipt of the PDCCH downlink subframe.

14. The method of claim 9, wherein the uplink access configuration information includes an uplink access waveform trigger, wherein the user terminal sends a waveform having a predetermined characteristic based on the uplink access waveform trigger.

15. The method of claim 9 further comprising receiving the PDCCH at a beginning portion of a subframe, the subframe comprising a control region at the beginning portion of the subframe.

* * * * *